(12) United States Patent
Pflaum et al.

(10) Patent No.: US 10,355,486 B2
(45) Date of Patent: Jul. 16, 2019

(54) METHOD OF CONTROLLING AN ELECTRICAL PRODUCTION STATION

(71) Applicant: Schneider Electric Industries SAS, Rueil-Malmaison (FR)

(72) Inventors: Peter Pflaum, Meylan (FR); Mazen Alamir, Saint Martin d'Heres (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 120 days.

(21) Appl. No.: 15/695,290

(22) Filed: Sep. 5, 2017

(65) Prior Publication Data

US 2018/0069401 A1 Mar. 8, 2018

(30) Foreign Application Priority Data

Sep. 7, 2016 (FR) ...................................... 16 58293

(51) Int. Cl.
*G06F 19/00* (2018.01)
*H02J 3/38* (2006.01)
(Continued)

(52) U.S. Cl.
CPC ................ *H02J 3/382* (2013.01); *G05F 1/66* (2013.01); *G06G 7/122* (2013.01); *G06G 7/635* (2013.01);
(Continued)

(58) Field of Classification Search
CPC ........ H02J 3/382; H02J 3/32; H02J 2003/003; G06G 7/122; G06G 7/66; G05F 1/66
See application file for complete search history.

(56) References Cited

U.S. PATENT DOCUMENTS 7,930,070 B2 * 4/2011 Imes ...................... G06Q 50/06
  700/291
8,222,765 B2 * 7/2012 Collins ..................... H02J 3/28
  307/44
(Continued)

FOREIGN PATENT DOCUMENTS

FR 2 996 695 A1 4/2014

OTHER PUBLICATIONS

Patterson, Maxx, Narciso F. Macia, and Arunachala M. Kannan. "Hybrid microgrid model based on solar photovoltaic battery fuel cell system for intermittent load applications." IEEE Transactions on Energy Conversion 30.1 (2015): 359-366. (Year: 2015).*
Xie, Le, and Marija D. Ilic. "Model predictive economic/environmental dispatch of power systems with intermittent resources." 2009 IEEE Power & Energy Society General Meeting. IEEE, 2009. (Year: 2009).*
(Continued)

*Primary Examiner* — Michael D Masinick
(74) *Attorney, Agent, or Firm* — Oblon, McClelland, Maier & Neustadt, L.L.P.

(57) ABSTRACT

A method of controlling an electricity production station including at least one renewable energy source and an energy accumulation system, allowing an operator to commit, at an electrical distribution network manager, to a power profile $P_G$ that the station will be able to deliver over a forthcoming time period. The declared power profile must, furthermore, comply with constraints imposed by the manager of the electricity distribution network. Non-compliance with this commitment may be subject to penalties. It is then incumbent on the operator to best optimize the method of controlling the electricity production station so as to maximize the electrical power fed into the network, while complying, in so far as possible, over a certain tolerance range, with the power profile commitment $P_G$.

11 Claims, 5 Drawing Sheets

(51) Int. Cl.
 *G05F 1/66* (2006.01)
 *G06G 7/122* (2006.01)
 *G06G 7/635* (2006.01)
 *G06G 7/66* (2006.01)
 *H02J 3/32* (2006.01)
 *H02J 3/00* (2006.01)

(52) U.S. Cl.
 CPC .............. *G06G 7/66* (2013.01); *H02J 3/32* (2013.01); *H02J 2003/003* (2013.01); *Y02E 70/30* (2013.01)

(56) References Cited

U.S. PATENT DOCUMENTS

| | | | |
|---|---|---|---|
| 8,996,187 B2 | 3/2015 | Sharma et al. | |
| 2014/0236883 A1* | 8/2014 | Ye | G06N 7/02 706/52 |
| 2015/0263563 A1 | 9/2015 | Kharrat et al. | |
| 2016/0380444 A1* | 12/2016 | Al Shakarchi | H02J 3/382 320/107 |
| 2016/0380460 A1* | 12/2016 | Dominguez Amarillo | H02J 7/0063 307/74 |

OTHER PUBLICATIONS

Borges, Carmen Lucia Tancredo. "An overview of reliability models and methods for distribution systems with renewable energy distributed generation." Renewable and sustainable energy reviews 16.6 (2012): 4008-4015. (Year: 2012).*

Xie, Le, and Marija D. Ilic. "Model predictive dispatch in electric energy systems with intermittent resources." 2008 IEEE International Conference on Systems, Man and Cybernetics. IEEE, 2008. (Year: 2008).*

Nakayama, Kiyoshi. A Distributed Smart Grid Control Model for Integration of Renewables. University of California, Irvine, 2014. (Year: 2014).*

French Preliminary Search Report dated Jun. 23, 2017 in French Application 16 58293, filed on Sep. 7, 2016 ( with English translation of Categories of Cited Documents).

Gabriela Hug-Glanzmann "Coordination of Intermittent Generation with Storage, Demand Control and Conventional Energy Sources", 2010 IREP Symposium, Bulk Power System Dynamics and Control, 2010, 7 pages.

E.B.Iversen et al "Probabilistic Forecasts of Solar Irradiance by Stochastic Differential Equations", Technical University of Denmark, http://orbit.dtu.dk.files.100775427/EnvSolarSDE.pdf, 2017, 31 pages.

* cited by examiner

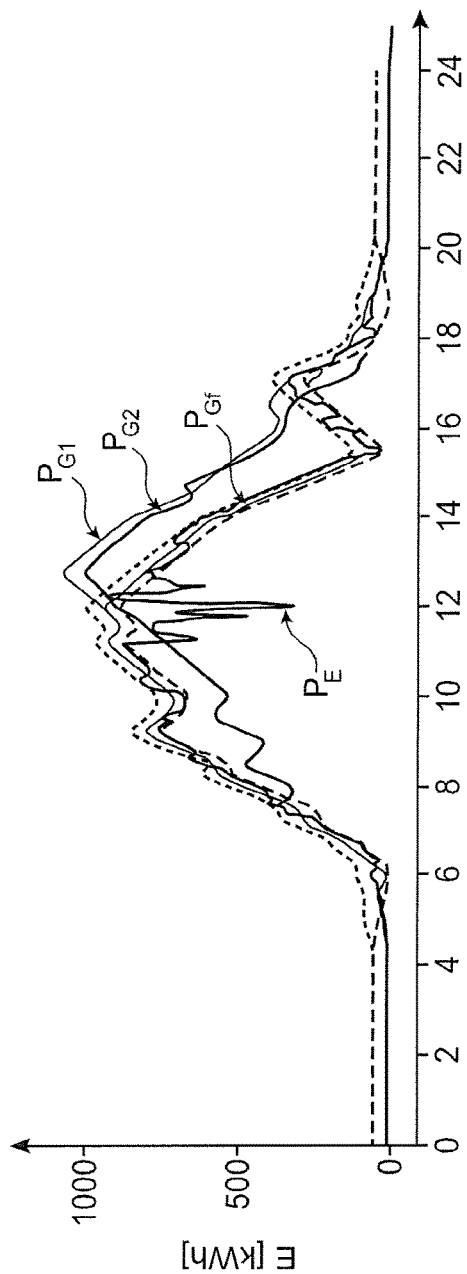
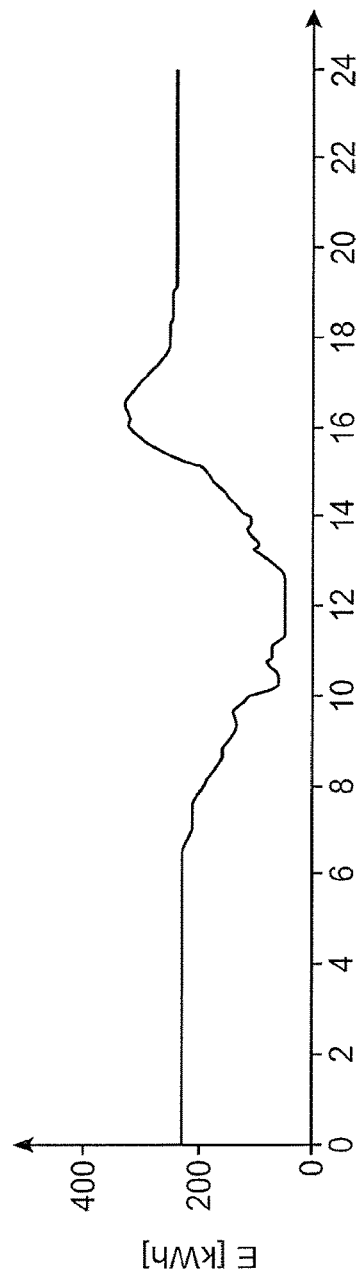

METHOD OF CONTROLLING AN ELECTRICAL PRODUCTION STATION

TECHNICAL FIELD

The present invention relates to a method of controlling a renewable energy production station. More particularly, the method of controlling the station aims to predict a profile of power intended to be delivered to an electrical distribution network with a given confidence index.

PRIOR ART

Renewable energy sources are known to have an intermittent and fluctuating nature which must constantly be offset by conventional sources of energy production in order to provide the stability of the electrical distribution networks to which they are connected.

This offsetting imposes however, on the conventional sources of energy production, constraints affecting the operation and the performance thereof. These constraints are all the greater since the renewable energy sources are increasingly decentralized (in other words at a distance from the conventional sources of production).

Moreover, offsetting the fluctuations through the conventional sources of energy production has a direct impact on the quality of the voltage and of the current that are delivered to the electricity distribution network due to the reaction time thereof.

As a result, the increase in popularity of the renewable energy production stations requires the operation and the control thereof to be rethought.

In this respect, it is henceforth required of the operators of renewable energy production stations to declare, in advance, a power profile that they envisage feeding into the distribution network.

Thus, the document U.S. Pat. No. 8,996,187 proposes a method of sizing an energy accumulation system intended to offset the effects of the intermittence of renewable energy production sources. More particularly, this method takes into account the uncertainties of the forecasts of renewable energy production and of consumption using a stochastic approach such as to balance the production and the consumption of energy.

However, this method is not satisfactory.

Indeed, the subject matter of this method is mainly the sizing of the energy accumulation system and the method cannot guarantee, to the operator thereof, an optimum feed, into the electricity distribution network, of the power produced by the renewable energy production sources.

An aim of the present invention is then to propose a method of controlling a station, which method is calibrated such that a maximum of electrical power, taking into account the constraints which are imposed thereon, can be fed into the electrical distribution network.

Another aim of the present invention is also to propose a calibration process for optimising the method of controlling the station. More particularly, the calibration process is intended to guarantee, with a known confidence index, that a minimum power quantity can be fed into the electrical distribution network.

DISCLOSURE OF THE INVENTION

The aims of the invention are at least partially achieved by a method of controlling an electrical energy production station comprising at least one renewable energy source, and at least one energy accumulation system, the method comprising:

a step of determining, via an optimal module, a power profile $P_G$ to be declared, the power profile $P_G$ being a profile of a power intended to be delivered over a time period T, starting at an instant $t_0$, by the electrical energy production station, the power profile $P_G$ being determined with respect to a power profile production forecast $P_R$ for the at least one renewable energy source, and corresponding to a power profile $P(t)$ for maximizing an objective function F of the form:

$$F = \sum_{t=t_0}^{t_0+T} (P(t) - \rho \cdot \|SOC(t) - \theta_1 \cdot C_{bat}\|)$$

$P(t)$ being a power at an instant t of the period T, $SOC(t)$ a state of charge, which is adjustable, of the energy accumulation system at an instant t of the period T, $\rho$ is a weighting factor, and $C_{bat}$ being the capacity of the energy accumulation system, the power profile $P_G$ being subjected to a constraint of the form:

$$P_G \leq \theta_2 \cdot P_R - P_{bat}$$

$P_{bat}$ being the power consumed by the energy accumulation system, the quantities $\theta_1$ and $\theta_2$ corresponding to components of a predetermined-design vector $\theta$.

The design vector $\theta$ advantageously represents a state of calibration of the method of controlling an electrical energy production station, according to the invention. More particularly, the design vector $\theta$ is suitable for providing, with a known degree of confidence, a maximum power produced by the renewable energy source and which complies with the power profile $P_G$ to be declared.

According to one mode of implementation, the method further comprises a regulation step, undertaken by a real-time module, intended to adjust, in real-time, the state of charge $SOC(t)$ such as to regulate a power $P_E$, actually delivered by the electrical energy production station, compliant, and in a given tolerance range, with the power profile $P_G$.

According to a mode of implementation, the state of charge $SOC(t)$ of the energy accumulation system must comply with the following constraint for each instant t of the period T:

$$0.05 \cdot C_{bat} \leq SOC(t) \leq 0.95 \cdot C_{bat}$$

According to one mode of implementation, the power $P_{bat}$ consumed by the energy accumulation system (30) is kept between a minimum power $P_{batmin}$ and a maximum power $P_{batmax}$.

According to a mode of implementation, the state of charge $SOC(t)$ at each instant t varies according to a linear function of the consumed power $P_{bat}$, advantageously, the state of charge $SOC(t)$ is such that:

$$SOC(t) = SOC_0 + \alpha \cdot \sum_{\tau=t_0}^{t} P_{bat}^{\tau}$$

$SOC_0$ being the state of charge at the instant $t_0$, $P_{bat}^\tau$ being the power consumed by the accumulation system at the instant $\tau$, and $\alpha$ a characteristic fixed parameter of the energy accumulation system.

According to a mode of implementation, the slope at any point of the power profile $P_G$ is bounded by a negative slope $dP_{G-}$ and a positive slope $dP_{G+}$.

The invention also relates to a method of determining a design vector $\theta$ associated with an electrical energy production station comprising at least one renewable energy source and at least one energy accumulation system, the method comprising:

a) a step of selecting, over a past period Tp starting at an instant $t_0$, a power profile production forecast $P_{RP}$, for at least one renewable energy source, b) a step of calculating, for the power profile production prediction $P_{RP}$, a number n, which is an integer, of power profiles $P_{Ri}$, with i varying between 1 and n, the power profiles $P_{Ri}$ each accounting for an uncertainty affecting the forecast $P_{RP}$, c) a step of defining a first set of m values $\theta_{1,l}$, l being an integer varying between 1 and m, and a second set of p values $\theta_{2,k}$, k being an integer varying between 1 and p, d) a step of calculating, for the period Tp, for each of the m*p pairs of values $(\theta_{1,l}, \theta_{2,k})$, l and k varying between 1 and m, and between 1 and p, respectively, a power profile $P(t)_{l,k}$, noted as $P_{G,l,k}$ and maximizing a function $F_{l,k}$:

$$F_{l,k} = \sum_{t=t_0}^{t_0+Tp} (P(t)_{l,k} - \rho \cdot \|SOC(t) - \theta_{1,l} \cdot C_{bat}\|)$$

and $P_{G,l,k}$ complying with the constraint:

$$P_{G,l,k} \leq \theta_{2,k} P_R - P_{bat}$$

$\rho$ being a weighting factor, and $SOC(t)$ and $C_{bat}$ being an adjustable state of charge and a capacity of the energy accumulation system, respectively, e) a step of simulating use of a real-time module, for each power profile $P_{G,l,k}$ determined in the step d., and considering that the renewable energy source delivers a power profile $P_{Ri}$ determined in the step b), the real-time module being intended to adjust, in real-time, the state of charge $SOC(t)$ of the energy accumulation system such as to regulate a power $P_{E,l,k,i}$, actually delivered by the electrical energy production station, compliant with the power profile $P_{G,l,k}$, the simulating step also comprising the calculation of the m*p relative differences, $S_{l,k,i}$, between the power profiles $P_{E,l,k,i}$, and $P_{G,l,k}$, a performance indicator $I_{l,k,i}$ equal to zero being assigned to the relative difference $S_{l,k,i}$, as soon as said difference is less than a threshold difference Es, the performance indicator $I_{l,k,i}$ being otherwise equal to one, the step e) being undertaken for each power profile $P_{Ri}$ calculated in the step b), f) a step of calculating, for each index pair l and k, the sum $I_{l,k} = \Sigma_{i=1}^n I_{l,k,i}$, the design vector $\theta$ comprising a pair of components $(\theta_1, \theta_2)$ that are selected from the pairs of vectors $(\theta_{1,l}, \theta_{2,k})$ for which the sum $I_{l,k}$ is less than a predetermined positive integer q.

According to a mode of implementation, as soon as a plurality of pairs $(\theta_{1,l}, \theta_{2,k})$ is selected in the step f), the method further comprises a step for additional selection of a pair $(\theta_{1,l}, \theta_{2,k})$ from the plurality of selected pairs, the pair selected during the additional step being the pair $(\theta_{1,l}, \theta_{2,k})$ associated with the power profile $P_{G,l,k}$ having the greatest area.

According to a mode of implementation, the number n of power profiles $P_{Ri}$, is such that:

$$n \geq \frac{1}{\eta}\left(\frac{e}{e-1}\right)\left(\ln\frac{m \cdot p}{\delta} + q\right)$$

$\eta$ being an accuracy parameter between 0 and 1, advantageously less than 0.1, and $\delta$ a confidence indicator between 0 and 1, advantageously less than 0.1.

According to a mode of implementation, the first set of m values $\theta_{1,l}$ comprises the set of values $\{0.3; 0.5; 0.7\}$.

According to a mode of implementation, the second set of p values $\theta_{2,k}$ comprises the set of values $\{0.9; 0.95; 1; 1.05; 1.1\}$.

BRIEF DESCRIPTION OF THE DRAWINGS

Other features and advantages will appear in the following description of modes of implementing the method of controlling an electrical energy production station, which are given as nonlimiting examples, with reference to the appended drawings, wherein:

FIG. 5a is a graph of declared powers $P_{G1}$, $P_{G2}$, $P_{G3}$, and of the power $P_E$ actually delivered (vertical axis) as a function of time (horizontal axis) by the electrical energy production station controlled by the control method according to the invention, FIG. 5b is a graph of the state of charge SOC of the energy accumulation system (vertical axis) as a function of time.

DETAILED DISCLOSURE OF SPECIFIC EMBODIMENTS

The present invention implements a method of controlling an electricity production station comprising at least one renewable energy source and an energy accumulation system.

The invention is principally based on the idea that the operators of electricity production stations, and more particularly the stations comprising intermittent or renewable energy sources, must be able to commit, at an electrical distribution network manager, to a power profile that said station will be able to deliver over a forthcoming time period. The declared power profile must, furthermore, comply with constraints imposed by the manager of the electricity distribution network. Non-compliance with this commitment may be subject to penalties, for example financial penalties. It is then incumbent on the operator to best optimize the control of the electricity production station so as to maximize the electrical power fed into the network, while complying, in so far as possible, over a certain tolerance range, with the power profile commitment.

Throughout the description, integer means a positive integer.

Figure 1:
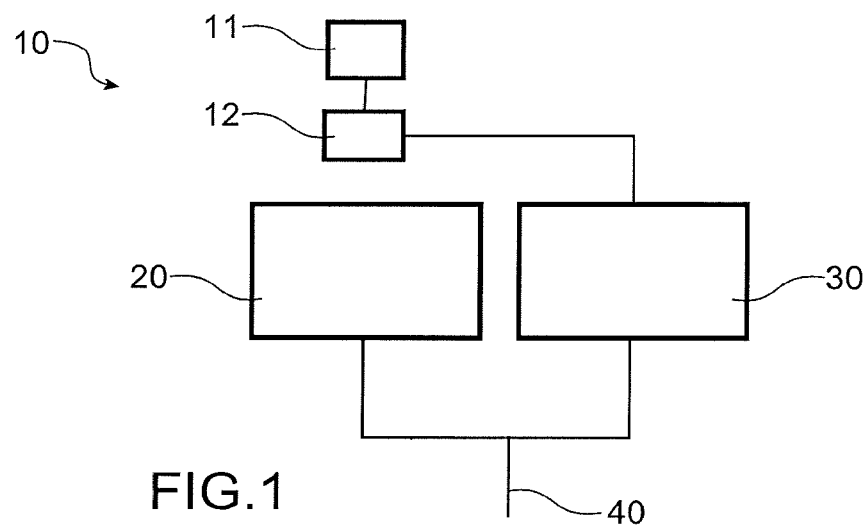
FIG. 1 is a schematic representation of an electrical energy production station intended to be controlled by the method according to the invention.

The method according to the invention then relates to the control of an electrical energy production station 10 shown in FIG. 1.

The electrical energy production station 10 comprises at least one renewable energy source 20. The renewable energy source 20 has an intermittent nature, in other words, it can be subject to some uncertainties, for example weather uncertainties, which make the energy production thereof uncertain, and therefore quite difficult to forecast. The renewable energy source 20 can comprise at least one of the sources chosen from: a photovoltaic energy source and/or a wind energy source.

The electrical energy production station 10 also comprises at least one energy accumulation system 30. The energy accumulation system can comprise a battery, a supercapacitor.

The method according to the invention comprises a step of determining, using an optimal module 11, a power profile $P_G$ to be declared.

Power profile means a progression of the power as a function of time.

More particularly, the power profile $P_G$ is a profile of a power intended to be delivered, over a time period T starting at an instant $t_0$, by the electrical energy production station 10.

The time period is, for example, a period of 24 hours or 48 hours. The instant $t_0$ corresponds to the start of a day.

The power profile $P_G$ is determined prior to the instant $t_0$, for example 24 hours prior to the instant $t_0$. Thus, the power profile $P_G$ can be declared 24 hours prior to the instant $t_0$. After a first declaration of the power profile $P_G$, the operator of the electrical energy production station can be offered the possibility of correcting the declaration thereof upwards and downwards.

According to the invention, the power profile $P_G$ is determined with respect to a power profile production forecast $P_R$ for the at least one renewable energy source 20, and corresponds, moreover, to a power profile P(t) for maximizing an objective function F of the form:

$$F = \sum_{t=t_0}^{t_0+T} (P(t) - \rho \cdot \|SOC(t) - \theta_1 \cdot C_{bat}\|)$$

P(t) is a power at an instant t of the period T, SOC(t) a state of charge, that is adjustable, of the energy accumulation system 30 at an instant t of the period T, $\rho$ is a weighting factor, and $C_{bat}$ is the capacity of the energy accumulation system 30.

The power profile $P_G$ is also subjected to a constraint of the form:

$$P_G \leq \theta_2 \cdot P_R - P_{bat}$$

where $P_{bat}$ is the power consumed by the energy accumulation system 30.

Power consumed $P_{bat}$ means a power actually consumed as soon as $P_{bat}$ is positive, and a power delivered by the accumulation system 30 as soon as $P_{bat}$ is negative.

The quantities $\theta_1$ and $\theta_2$ are components of a design vector $\theta$, the determination of which will be detailed below in the disclosure of the invention.

The design vector $\theta$ corresponds to a state of calibration of the method of controlling the electrical energy production station 10, and is intended to take into account the uncertain nature of the power profile production forecast $P_R$ for the at least one renewable energy source 20. Indeed, the power profile production forecast $P_R$ is generally based on weather forecasts, and therefore has a degree of uncertainty. The components of the design vector $\theta$ are adjusted once the electrical energy production station 10 has been installed such as to guarantee an operation of said station to the best of the capacity thereof while complying with the constraints imposed by the manager of the electricity distribution network 40.

The objective function F can be maximized using numerical methods known to a person skilled in the art.

The profile $P_G$ is advantageously determined using a computing machine, for example a computer, more particularly a computer controlling the operation of the electrical energy production station 10.

It is henceforth noted that the power profile $P_G$ is calculated for discrete instants, for example at regular time intervals $\Delta t$. The time intervals $\Delta t$ can take at least one of the values chosen from: 1 minute, 5 minutes, 10 minutes, 15 minutes, 20 minutes, 30 minutes, 60 minutes.

Advantageously, the method further comprises a regulation step. Said regulation step can be undertaken by a real-time module 12. The real-time module 12 is intended to adjust, in real time (in other words during the period T), the state of charge SOC(t) of the energy accumulation system 30 such as to regulate a power $P_E$, which is actually delivered by the electrical energy production station 10, compliant, and in a given tolerance range, with the power profile $P_G$.

"Compliant with the power profile $P_G$ in a given tolerance range" means that the power profile $P_E$, that is actually delivered, can deviate from the power profile $P_G$ by plus or minus twelve percent (±12%), advantageously by plus or minus six percent (±6%).

Other constraints can be imposed by the manager of the electricity distribution network 40, or be technical constraints of the constituent elements of the network.

For example, a minimum state of charge and a maximum state of charge of the energy accumulation system 30 can be imposed. For example, the state of charge SOC(t), at each instant t of the period T, of the energy accumulation system can be between 5% and 95% of the accumulation capacity $C_{bat}$ thereof, namely $$0.05 \cdot C_{bat} \leq SOC(t) \leq 0.95 \cdot C_{bat}$$

Moreover, it can also be necessary to impose limits of power consumed by the energy accumulation system 30, for example the power $P_{bat}$ consumed by the energy accumulation system 30 is kept between a minimum power $P_{batmin}$ and a maximum power $P_{batmax}$.

The determination of the power profile $P_G$ can also be constrained by the charge equation of the energy accumulation system 30. Indeed, the maximum variation of the state of charge SOC(t) is proportional to the power consumed $P_{bat}$ by said system 30. Thus, the state of charge SOC(t) of the system 30 can be such that:

$$SOC(t) = SOC_0 + \alpha \cdot \sum_{\tau=t_0}^{t} P_{bat}^\tau$$

where $SOC_0$ is the state of charge at the instant $t_0$, $P_{bat}^\tau$ being the power consumed by the accumulation system 30 at the instant $\tau$, and $\alpha$ a characteristic fixed parameter of the energy accumulation system 30, which can take two different values depending on whether the system is in the charge or discharge phase.

The operator can also impose a constraint on the slope of the profile $P_G$. The slope of the profile $P_G$ designates the difference between two discrete successive values calculated in the step of determining, using an optimal module 11, a power profile $P_G$ to be declared. The slope at any point of the power profile $P_G$ is bounded by a negative slope $dP_{G-}$ and a positive slope $dP_{G+}$.

The invention also relates to a method of determining the design vector of an electrical energy production station 10 comprising at least one renewable energy source 20, and at least one energy accumulation source 30.

Figure 2:
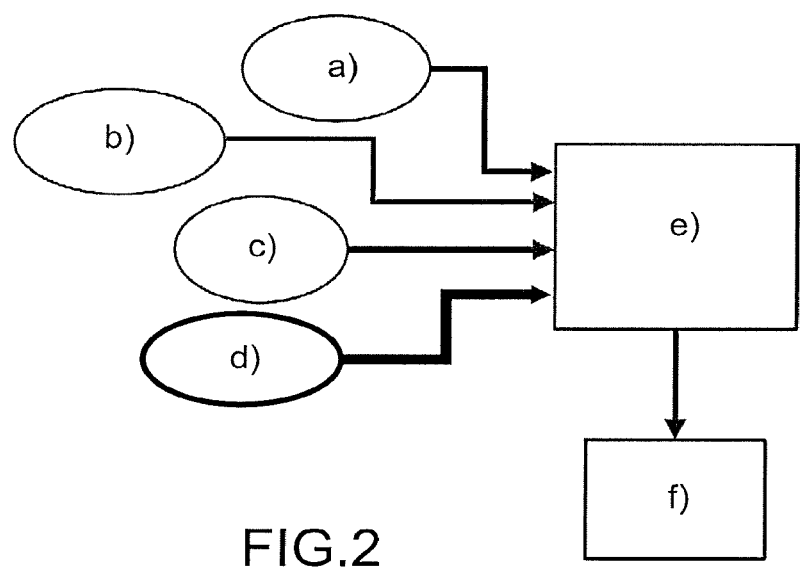
FIG. 2 is a process diagram for implementing the method of determining a design vector $\theta$ associated with an electrical energy production station according to the invention.

The method (illustrated in FIG. 2) of determining the design vector $\theta$ comprises a step a) of selecting, over a past period Tp starting at an instant $t_0$, a power profile production forecast $P_{RP}$, for the at least one renewable energy source 20. The forecast can, for example, be based on forecasts of parameters (for example weather parameters) influencing the power production of the renewable energy source 20.

The past period Tp is, for example, a representative day of the year. Several past periods Tp can be considered to take into account the seasonal nature of the predictions.

The method of determining the design vector $\theta$ comprises, in addition, a step b) of calculating, for the power production past prediction $P_{RP}$, a number n, that is an integer, of power profiles $P_{Ri}$, with i varying between 1 and n, the power profiles $P_{Ri}$ each accounting for an uncertainty affecting the forecast $P_{RP}$.

The power profiles $P_{Ri}$ can be generated by an uncertainty generator. By way of example, a person skilled in the art will find in the document [1], cited at the end of the description, the elements necessary for implementing an uncertainty generator.

The n power profiles $P_{Ri}$ represent the differences that can arise with respect to the power production past prediction $P_{RP}$.

The method of determining the design vector $\theta$ comprises a step c. of defining a first set of m values $\theta_{1,l}$, l being an integer varying between 1 and m, and a second set of p values $\theta_{2,k}$, k being an integer varying between 1 and p.

For example, the first set of m values $\theta_{1,l}$ comprises the set of values {0.3; 0.5; 0.7}.

In an equivalent manner, a second set of p values $\theta_{2,k}$ comprises the set of values {0.9; 0.95; 1; 1.05; 1.1}.

The method of determining the design vector $\theta$ comprises a step d) of calculating, for the period Tp, for each of the m*p pairs of values $(\theta_{1,l}, \theta_{2,k})$, l and k varying between 1 and m, and between 1 and p, respectively, a power profile $P(t)_{l,k}$, noted as $P_{G,l,k}$ and maximizing a function $F_{l,k}$ $$F_{l,k} = \sum_{t=t_0}^{t_0+Tp} (P(t)_{l,k} - \rho \cdot \|SOC(t) - \theta_{1,l} \cdot C_{bat}\|)$$

and $P_{G,l,k}$ complying with the constraint:

$$P_{G,l,k} \theta_{2,k} \cdot P_R - P_{bat}$$

$\rho$ being a weighting factor, and $SOC(t)$ and $C_{bat}$ being an adjustable state of charge and a capacity of the energy accumulation system 30, respectively.

The profiles $P_{G,l,k}$ are advantageously determined using a computing machine, for example a computer, more particularly a computer controlling the operation of the electrical energy production station 10.

The method of determining the design vector $\theta$ comprises a step e) for simulating use of a real-time module 12, for each power profile $P_{G,l,k}$ determined in the step d), and given that the renewable energy source 20 delivers a power profile $P_{Ri}$ determined in the step b).

The real-time module 12 is intended to adjust, in real time, the state of charge $SOC(t)$ of the energy accumulation system 30 such as to regulate a power $P_{E,l,k,i}$, that is actually delivered by the electrical energy production station 10, compliant with the power profile $P_{G,l,k}$.

The simulation step e) also comprises the calculation of the m*p relative differences, $S_{l,k,i}$, between the power profiles $P_{E,l,k,i}$, et $P_{G,l,k}$.

A performance indicator $I_{l,k,i}$ is calculated for each relative difference $S_{l,k,i}$. The performance indicator $I_{l,k,i}$ is equal to zero once the difference $S_{l,k,i}$ is less than a threshold value Es, and the performance indicator $I_{l,k,i}$ is equal to one when this is not the case. The threshold difference Es is generally dependent on the deviations in terms of power that can be supported by the electrical distribution network (the threshold difference Es is equal to 5%, for example).

The step e) is undertaken for each power profile $P_{Ri}$ calculated in the step b).

The method of determining the design vector $\theta$ comprises a step f) of calculating, for each index pair l and k, the sum $I_{l,k} = \sum_{i=1}^{n} I_{l,k,i}$.

The design vector $\theta$ then comprises a pair of components $(\theta_1, \theta_2)$ selected from the pairs of values $(\theta_{1,l}, \theta_{2,k})$ for which the sum $l_{l,k}$ is less than a predetermined positive integer q.

However, several pairs of values $(\theta_{1,l}, \theta_{2,k})$ can be selected at the end of the step f).

Therefore, once a plurality of pairs $(\theta_{1,l}, \theta_{2,k})$ is selected in the step f), the method further comprises a step for additional selection of a pair $(\theta_{1,l}, \theta_{2,k})$ from the plurality of selected pairs. The pair selected during the additional step is the pair $(\theta_{1,l}, \theta_{2,k})$ associated with the power profile $P_{G,l,k}$ having the greatest area. In other words, the selected pair $(\theta_{1,l}, \theta_{2,k})$ is that which allows for feeding the greatest amount of power into the electricity distribution network 40.

Advantageously, the value $(\theta_{1,l}, \theta_{2,k})$ pair(s) selected in the step f. correspond to a sum $l_{l,k}$ less than an integer q (the integer is also called the failure number).

Thus, once this condition is not met (none of the sums $I_{l,k}$ are less than q), it is recommended to once again undertake the method of determining the design vector $\theta$ by adjusting the step b). More particularly, a condition can be imposed on the number n of power profiles $P_{Ri}$. More particularly again, the integer n must comply with the following inequality, relating to the randomized algorithms:

$$n \geq \frac{1}{\eta} \left( \frac{e}{e-1} \right) \left( \ln \frac{m \cdot p}{\delta} + q \right)$$

$\eta$ being an accuracy parameter between 0 and 1, advantageously less than 0.1, $\delta$ a confidence indicator between 0 and 1, advantageously less than 0.1, and "e" the exponential number.

The pair of values $(\theta_{1,l}, \theta_{2,k})$, hereafter identified with $(\theta_1, \theta_2)$, is advantageously implemented in the context of the method of controlling an electrical energy production station 10.

The term $\theta_1$ is a calibration term for the design vector $\theta$ intended to give preference to a state of charge SOC level of the energy accumulation system 30. For example, $\theta_1$=0.3 tends to favour a state of charge of the accumulation system at 30%.

The term $\theta_2$ is an adaptability term for the amplitude of the profile $P_G$ to be declared, for ensuring that the power $P_G$ does not exceed the power production forecast $P_R$ less the power $P_{bat}$ consumed by the energy accumulation system 30. The term $\theta_2$ is particularly suitable in the context of the invention since it makes it possible to set the parameters, in an optimal manner, and taking into account the impact of the uncertainty of the production of renewable energy (produced by the renewable energy source), of the method of controlling the electrical production station according to the invention. More particularly, the term $\theta_2$ makes it possible to guarantee a feeding rate for the power actually produced by the renewable energy source 20 with a confidence index determined by said term $\theta_2$.

Figure 3:
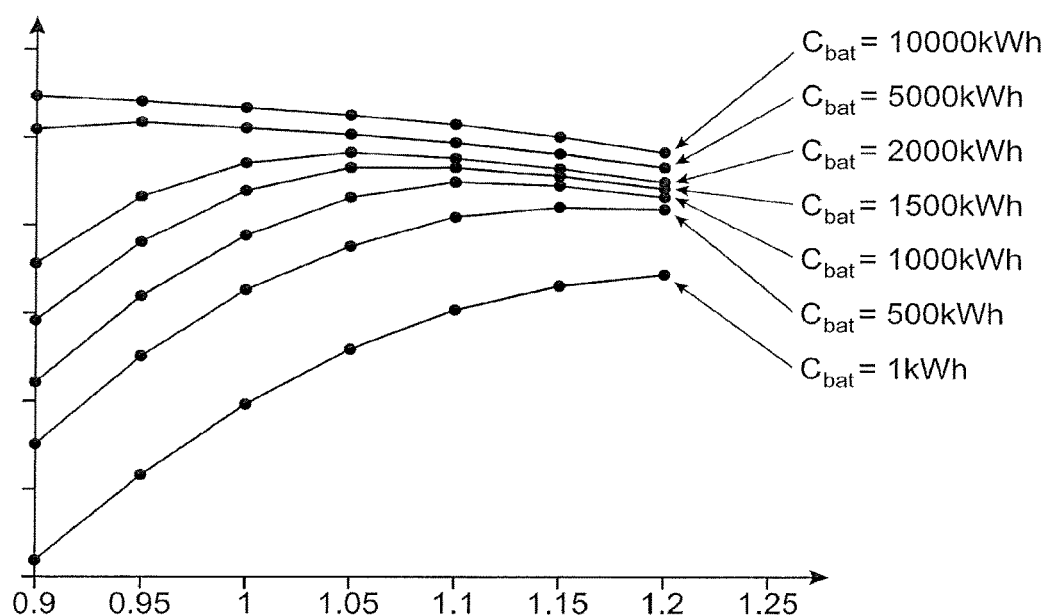
FIG. 3 is a graph of the maximum power (vertical axis) that an electricity production station controlled by the control method according to the invention can aim to feed into the distribution network as a function of the parameter $\theta_2$ (horizontal axis) for various energy accumulation source capacities $C_{bat}$.

FIG. 3 illustrates the effect of the parameter $\theta_2$ on the power supply expectation as a function of the capacity $C_{bat}$ of the energy accumulation system 30.

It is clearly observed, for an energy accumulation system of low storage capacity $C_{bat}$ (for example 1 kWh), that it can be favourable to have a parameter $\theta_2$ which suggests a power profile $P_G$ "greater" than the power profile production forecast $P_R$. As soon as the storage capacity increases, lower values of $\theta_2$ are to be favoured.

The method of controlling an electricity production station has been implemented in the context of a simulation.

The station 10 in question then comprises a photovoltaic energy source and an endogenous battery as an energy accumulation system.

The main elements of regulation (the constraints) imposed by the manager of the electricity distribution network 40 are as follows:
 the rated power Pnom of the electricity production station must be greater than 100 kW,
 the operator of the station must declare the power profile $P_G$ 24 hours before the instant t0, (start of the time period T),
 the slopes of the power profile $P_G$ are also constrained.

The operator of the station also has the possibility of declaring a new profile, on at least three occasions, for example, in the first 4, 10 and 14 hours of a period T of 24 hours. These three new declarations are noted as $P_{G,6-24}$, $P_{G,12-24}$ and $P_{G,16-24}$.

Figure 4A:
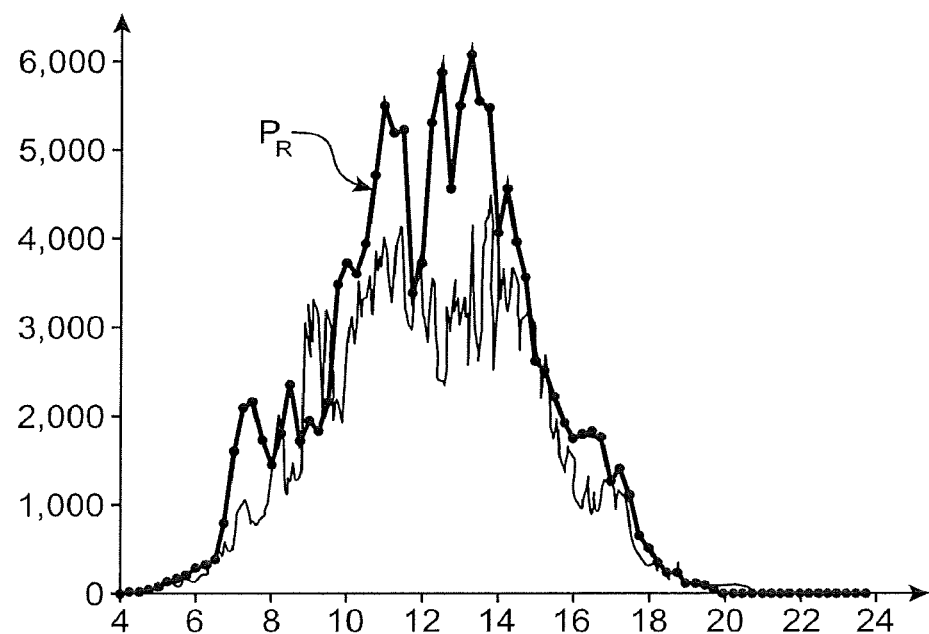
FIGS. 4a-4d are graphs, as a function of time (horizontal axis), for a comparison of the power actually produced by the electricity production station, and of the forecast of the power production profiles (lines with dots) for four different forecast instants, according to the invention.
Figure 4B:
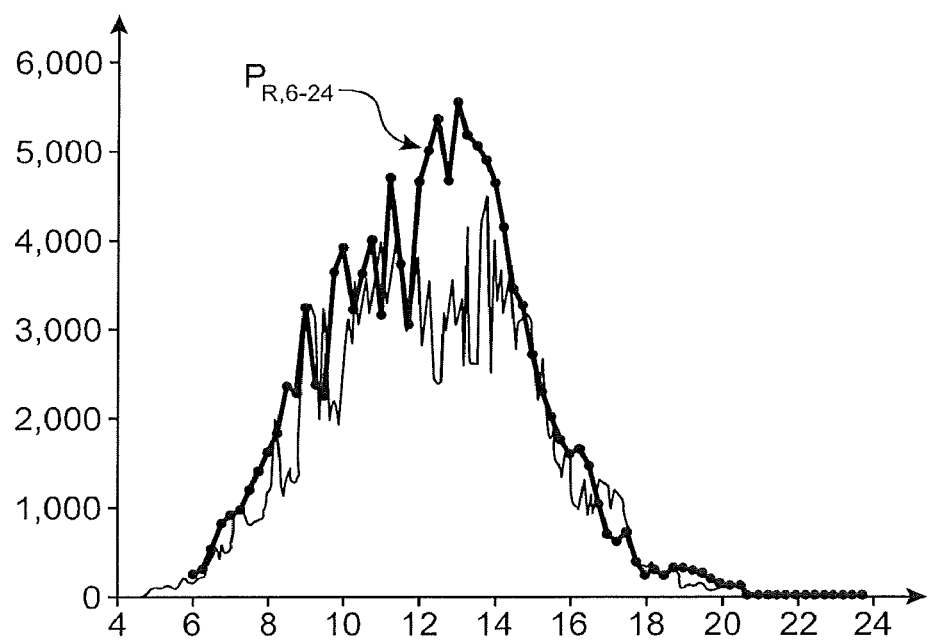
Figure 4C:
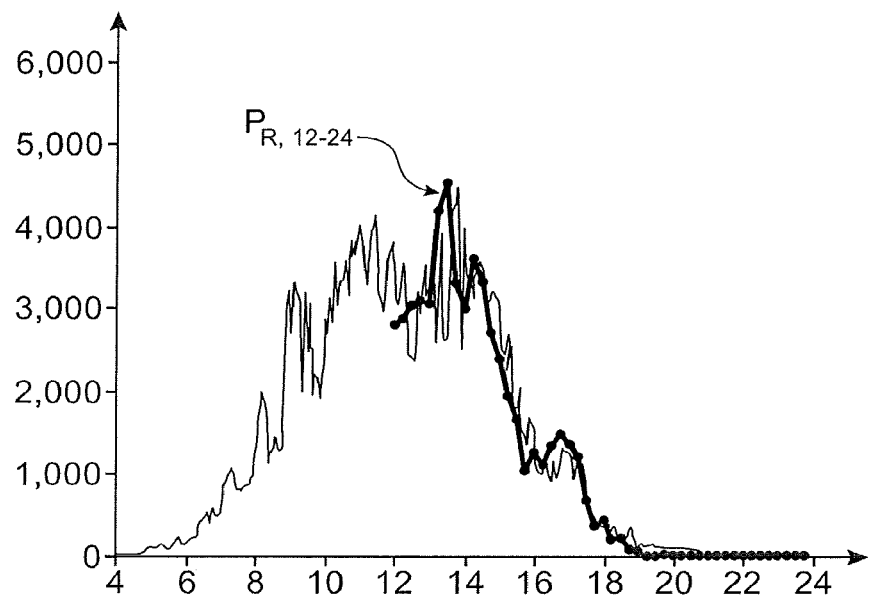
Figure 4D:
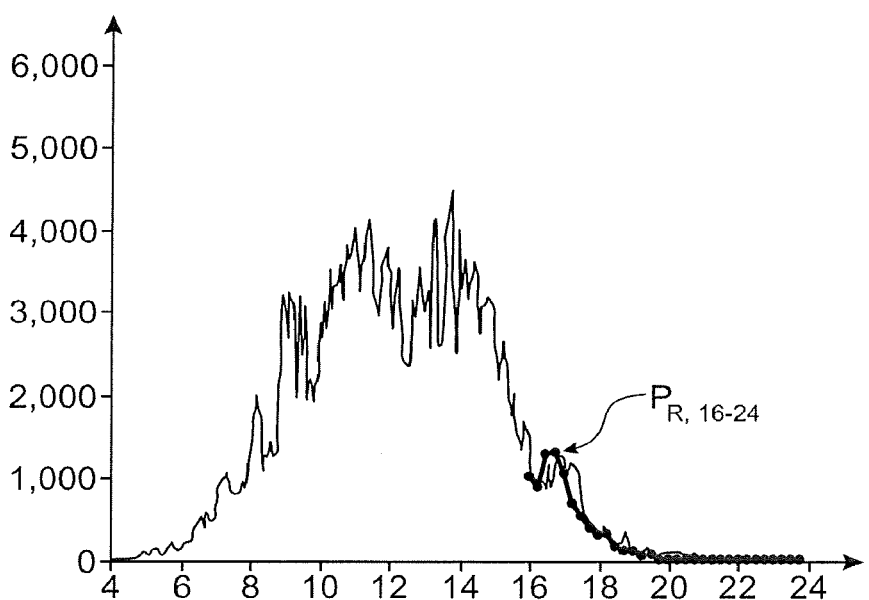

In FIG. 4a, the power production forecast $P_R$ of FIG. 4a is determined on the day preceding the period T and covers a period of 24 hours. The power production forecast $P_{R, 6-24}$ of FIG. 4b is determined in the first 4 hours of the period T and covers a period running from the sixth to the twenty fourth hour of the period T, the power production forecast $P_{R, 12-24}$ of the FIG. 4c is determined in the first 10 hours of the period T and covers a period running from the twelfth to the twenty fourth hour of the period T, the power production forecast $P_{R, 16-24}$ of the FIG. 4d is determined in the first 12 hours of the period T and covers a period running from the sixteenth to the twenty fourth hour of the period T.

For a given period T, the forecasts for power production $P_R$ by the photovoltaic energy source are known to improve once said period T approaches. Thus, these new forecasts make it possible to adjust the declared profile as best as possible. This effect is clearly observed in FIGS. 4a-4d.

FIGS. 5a-5b also show the implementation of a simulation of the method of controlling the electricity production station according to the present invention.

FIG. 5a shows the power profiles $P_{G1}$ initially declared the day before at 16 hours, and $P_{G2}$ declared on the actual day at 4 hours to the manager of the electricity distribution network 40. A notable difference is observed between the profiles $P_{G1}$, $P_{G2}$ and the profile $P_E$. The profile $P_{Gf}$ corresponds to a profile to which the operator of the production station has finally committed with the manager of the electricity distribution network 40. The profiles $P_E$ and $P_{Gf}$ are relatively similar (the real-time controller 12 keeps the power $P_E$ within the margin of tolerance imposed by the network manager which is symbolised by the curves in broken line) with the exception of a period around midday. This significant difference around midday also corresponds to a state of charge of the energy accumulation system equal to the lower limit of the state of charge of the accumulation system (FIG. 5b). This example yet again shows the advantage of being able to re-declare the profile $P_G$ during the progression of the period T.

The method of controlling an electricity production station thus makes it possible to guarantee, with a confidence index determined by a design vector $\theta$, a maximum feed of power into an electrical distribution network. The design vector $\theta$ is thus determined such that the probability of exceeding a threshold difference Es between the profiles $P_E$ and $P_G$ is less than $\eta$. More particularly, the control method according to the invention allows the operator of the station to commit to a power profile $P_G$ subjected to constraints imposed by the manager of the electrical distribution network. Indeed, the calibration of the method to obtain a design vector $\theta$, using a stochastic approach, makes it possible to take into account the intermittent nature of the renewable energy sources.

REFERENCES

[1] E. B. Iversen et al., "Probabilistic forecasts of solar irradiance using stochastic differential equations", Environmetrics, 25(3), May 2014, pages 152-164.

The invention claimed is:

1. A method of controlling an electrical energy production station comprising at least one renewable energy source, and at least one energy accumulation system, the method comprising:
 a step of determining, via an optimal module, a power profile $P_G$ to be declared, the power profile $P_G$ being a profile of a power intended to be delivered over a time period T, starting at an instant $t_0$, by the electrical energy production station, the power profile $P_G$ being determined with respect to a power profile production forecast $P_{RP}$ for at least one renewable energy source, and corresponding to a power profile P(t) for maximizing an objective function F of the form:

$$F = \sum_{t=t_0}^{t_0+T} (P(t) - \rho \cdot \|SOC(t) - \theta_1 \cdot C_{bat}\|)$$

P(t) being a power at an instant t of the period T, SOC(t) a state of charge, which is adjustable, of the energy accumulation system at an instant t of the period T, $\rho$ is a weighting factor, and $C_{bat}$ being the capacity of the energy accumulation system, the power profile $P_G$ being subjected to a constraint of the form:

$$P_G \leq \theta_2 \cdot P_R - P_{bat}$$

$P_{bat}$ being the power consumed by the energy accumulation system, the quantities $\theta_1$ and $\theta_2$ corresponding to components of a design predetermined vector $\theta$.

2. The method according to claim 1, wherein the method further comprises a regulation step, undertaken by a real-time module, intended to adjust, in real-time, the state of charge SOC(t) such as to regulate a power $P_E$, actually delivered by the electrical energy production station, compliant, and in a given tolerance range, with the power profile $P_G$.

3. The method according to claim 1, wherein the state of charge SOC(t) of the energy accumulation system must comply with the following constraint for each instant t of the period T:

$$0.05 \cdot C_{bat} \leq SOC(t) \leq 0.95 \cdot C_{bat}.$$

4. The method according to claim 1, wherein the power $P_{bat}$ consumed by the energy accumulation system is kept between a minimum power $P_{batmin}$ and a maximum power $P_{batmax}$.

5. The method according to claim 1, wherein the state of charge SOC(t) at each instant t varies according to a linear function of the consumed power $P_{bat}$, advantageously, the state of charge SOC(t) is such that:

$$SOC(t) = SOC_0 + \alpha \cdot \sum_{\tau=t_0}^{t} P_{bat}^{\tau}$$

$SOC_0$ being the state of charge at the instant $t_0$, $P_{bat}^{\tau}$ being the power consumed by the accumulation system at the instant $\tau$, and a $\alpha$ characteristic fixed parameter of the energy accumulation system.

6. The method according to claim 1, wherein the slope at any point of the power profile $P_G$ is bounded by a negative slope $dP_{G-}$ and a positive slope $dP_{G+}$.

7. The method of determining a design vector $\theta$ intended to be implemented according to claim 1, associated with an electrical energy production station comprising at least one renewable energy source and at least one energy accumulation system, the method comprising:

a) a step of selecting, over a past period Tp starting at an instant $t_0$, a power profile production forecast $P_{RP}$, for the least one renewable energy source, b) a step of calculating, for the power profile production prediction $P_{RP}$, a number n, which is an integer, of power profiles $P_{Ri}$, with i varying between 1 and n, the power profiles $P_{Ri}$ each accounting for an uncertainty affecting the forecast $P_{RP}$, c) a step of defining a first set of m values $\theta_{1,l}$, l being an integer varying between 1 and m, and a second set of p values $\theta_{2,k}$, k being an integer varying between 1 and p, d) a step of calculating, for the period Tp, for each of the m*p pairs of values $(\theta_{1,l}, \theta_{2,k})$, l and k varying between 1 and m, and between 1 and p, respectively, a power profile $P(t)_{l,k}$, noted as $P_{G,l,k}$ and maximizing a function $F_{l,k}$ $$F_{l,k} = \sum_{t=t_0}^{t_0+T_p} (P(t)_{l,k} - \rho \cdot \|SOC(t) - \theta_{1,l} \cdot C_{bat}\|)$$

and $P_{G,l,k}$ complying with the constraint $$P_{G,l,k} \leq \theta_{2,k} \cdot P_R - P_{bat}$$

$\rho$ being a weighting factor, and SOC(t) and $C_{bat}$ being an adjustable state of charge and a capacity of the energy accumulation system, respectively, e) a step of simulating use of a real-time module, for each power profile $P_{G,l,k}$ determined in the step d), and considering that the renewable energy source delivers a power profile $P_{Ri}$ determined in the step b), the real-time module being intended to adjust, in real-time, the state of charge SOC(t) of the energy accumulation system such as to regulate a power $P_{E,l,k,i}$, actually delivered by the electrical energy production station, compliant with the power profile $P_{G,l,k}$, the simulating step also comprising the calculation of the m*p relative differences, $S_{l,k,i}$, between the power profiles $P_{E,l,k,i}$, and $P_{G,l,k}$, a performance indicator $I_{l,k,i}$ equal to zero being assigned to the relative difference $S_{l,k,i}$, as soon as said difference is less than a threshold difference Es, the performance indicator $I_{l,k,i}$ being otherwise equal to one, the step e) being undertaken for each power profile $P_{Ri}$ calculated in the step b), f) a step of calculating, for each index pair l and k, the sum $I_{l,k} = \tau_{i=1}^{n} I_{l,k,i}$, the design vector $\theta$ comprising a pair of components $(\theta_1, \theta_2)$ that are selected from the pairs of values $(\theta_{1,l}, \theta_{2,k})$ for which the sum $I_{l,k}$ is less than a predetermined positive integer q.

8. The method according to claim 7, wherein, as soon as a plurality of pairs $(\theta_{1,l}, \theta_{2,k})$ is selected in the step f), the method further comprises a step for additional selection of a pair $(\theta_{1,l}, \theta_{2,k})$ from the plurality of selected pairs, the pair selected during the additional step being the pair $(\theta_{1,l}, \theta_{2,k})$ associated with the power profile $P_{G,l,k}$ having the greatest area.

9. The method according to claim 7, wherein the number n of power profiles $P_{Ri}$, is such that:

$$n \geq \frac{1}{\eta}\left(\frac{e}{e-1}\right)\left(\ln\frac{m \cdot p}{\delta} + q\right)$$

$\eta$ being an accuracy parameter between 0 and 1, advantageously less than 0.1, and $\delta$ a confidence indicator between 0 and 1, advantageously less than 0.1.

10. The method according to claim 7, wherein the first set of m values $\theta_{1,l}$, comprises the set of values {0.3; 0.5; 0.7}.

11. The method according to claim 7, wherein the second set of p values $\theta_{2,k}$ comprises the set of values {0.9; 0.95; 1; 1.05; 1.1}.

* * * * *